Feb. 18, 1958 — C. E. BEATY — 2,823,511
ECCENTRIC DEVICE FOR PICK-UP REEL
Filed Oct. 20, 1954 — 2 Sheets-Sheet 1
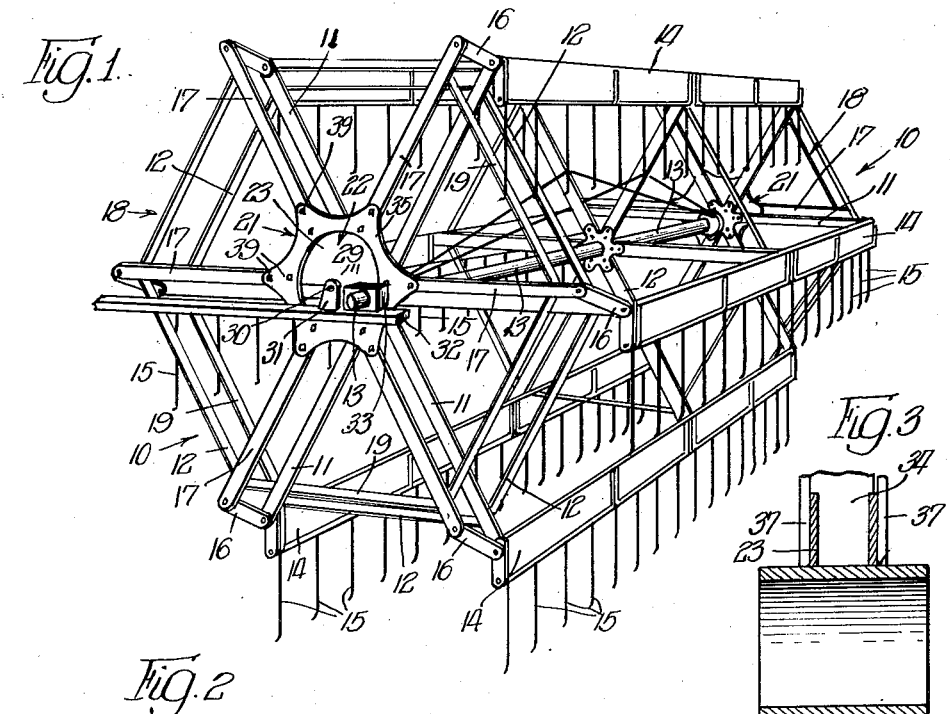
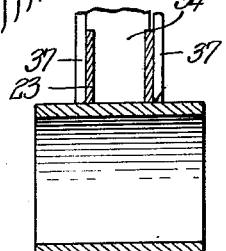
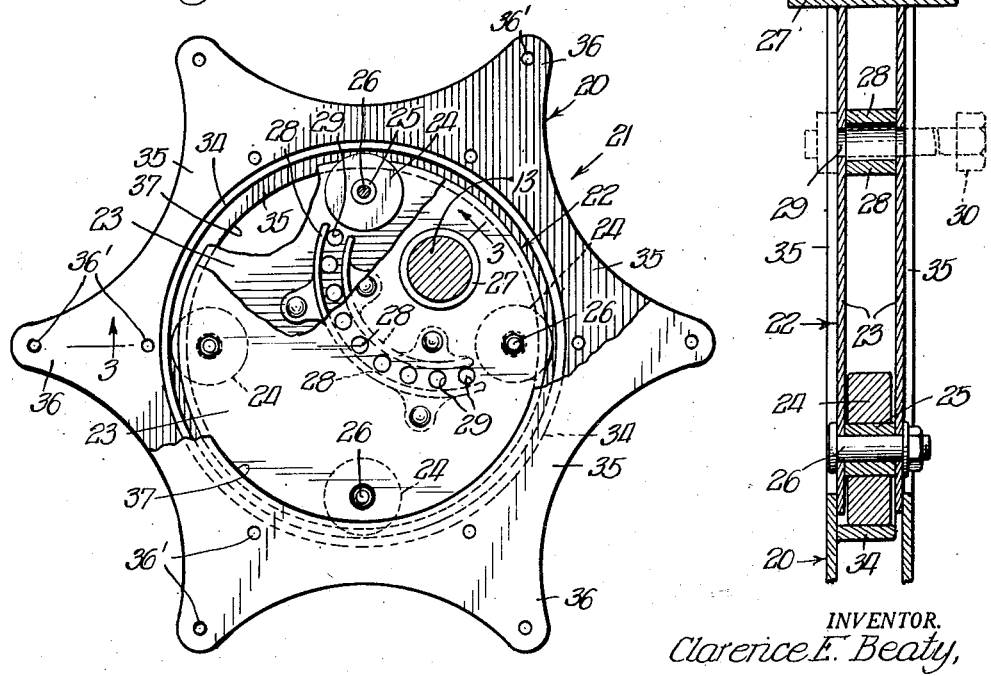
INVENTOR.
Clarence E. Beaty,
BY
Cromwell, Greist & Warden
ATTYS.

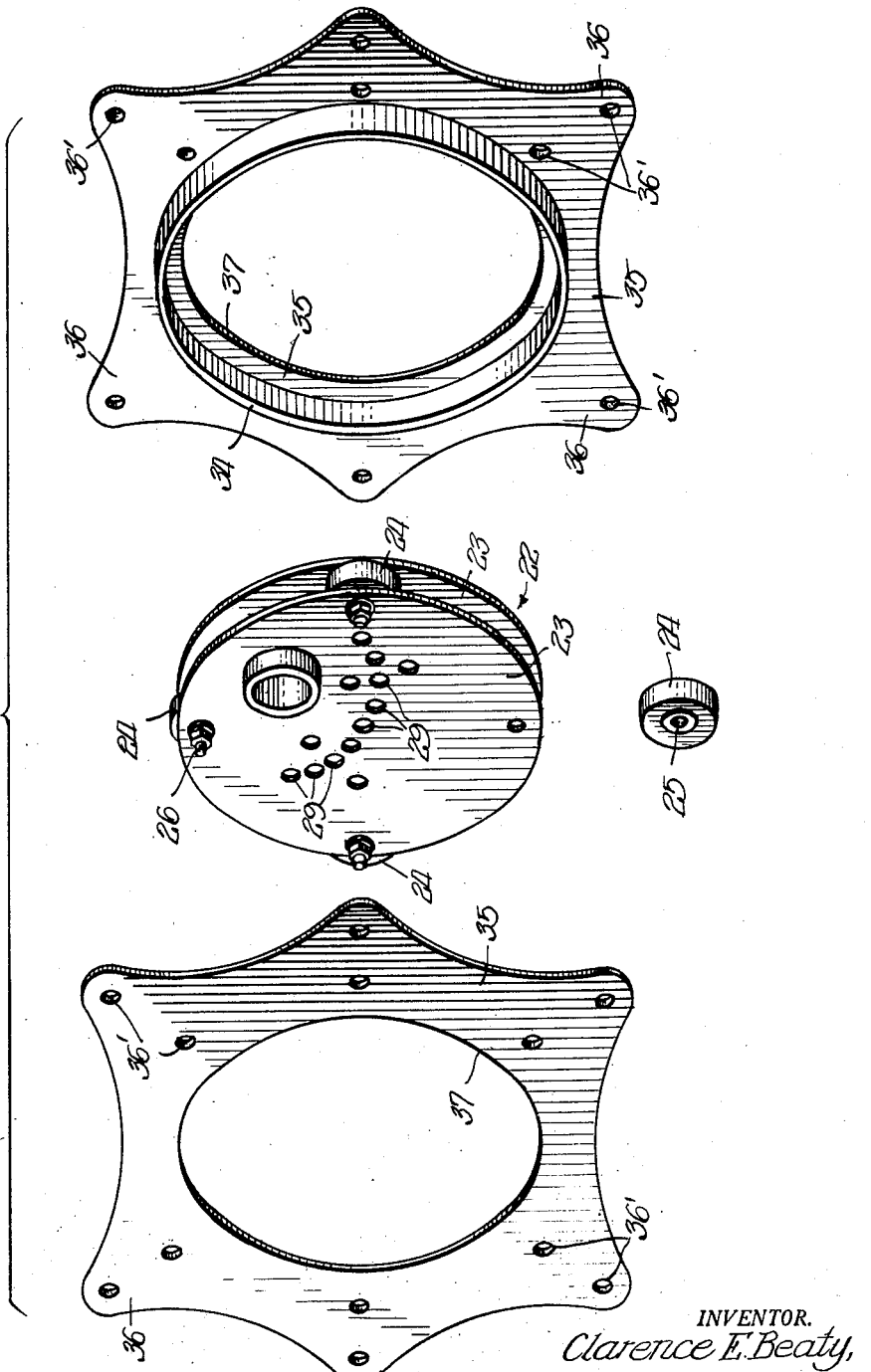

United States Patent Office 2,823,511
Patented Feb. 18, 1958

2,823,511

ECCENTRIC DEVICE FOR PICK-UP REEL

Clarence E. Beaty, Urbana, Ill., assignor to Harrison Cropsaver Co., Champaign, Ill., a corporation of Illinois Application October 20, 1954, Serial No. 463,414

4 Claims. (Cl. 56—226)

The present invention relates to improvements in a harvester pick-up reel of the sort which forms the subject matter of Letters Patent to William H. Harrison, No. 2,380,173 of July 10, 1945, and No. 2,431,397 of November 25, 1947.

The invention deals in particular with an improved eccentric device or unit for conventional bat and tine control structure as usually associated with such a reel. Two of these eccentric units are provided, being crank-connected with radially extending reel arms at either end of the reel; and they act to maintain wooden pick-up bats and wire tines, which are carried by those arms, in vertical position at all times, i. e., as the bats enter bent over grain, pass rearwardly to hold it in upright position for cutting, and then depart from the grain for a further operating cycle.

Eccentric units of this sort commonly take the form, as illustrated in Harrison Patent 2,431,397, of an eccentric spider unit having elongated arms radiating outwardly from the axis of a circular control track, which track is mounted eccentrically of the reel axis. These spider arms are each pivotally connected at their outer extremity to control cranks fixed to the individual pivots of reel bats on the outer ends of radial pick-up reel. Hence the sets of respective reel and eccentric control arms, projecting from the reel shaft and eccentric spider and coupled to one another by cranks, constitute a parallelogram linkage which, upon power actuated rotation of the pick-up reel proper, always maintains the pickup bats in vertical position. This general sort of reel construction is fully illustrated and described in the Harrison patent.

In known eccentric control constructions a bat control spider is rotatably mounted eccentrically of the reel shaft by means of a fixed circular cam track in eccentric relation to that shaft and external track following rollers, the rollers being rotatively mounted on the control spider and the spider carrying the radiating bat control arms. It has been found that exposure of those rollers and the eccentric stationary track to the elements and to dust, dirt, grain chaff and the like, has the effect of creating inefficiency and causing strain in operation, due to deterioration of parts and the increased frictional load brought out by these conditions.

Accordingly, the invention provides an improved eccentric device for pick-up reels, in which a centrally apertured, rotatable bat control spider carries a circular eccentric or cam track, the spider and track rotating about an axis in eccentric relation to the shaft or axle of the pick-up reel proper. This track shieldingly encircles and rollingly engages an improved, side shielded eccentric roller assembly or unit, in which anti-friction rollers are mounted in a circumferentially spaced series bearing the same eccentric relation to the reel shaft as the eccentric track on the bat control spider.

The spider has secured thereto the radial arms of the bat control unit, in known fashion, and side plates of the spider extend radially inwardly, at the aperture thereof, to outwardly overlap circular, roller shielding side disks of the roller assembly thus completing a practically perfect circumferential and lateral protecting housing for the eccentric track rollers. They are shielded from exposure to the elements at the inner annular perimeter of the track which houses them and runs on them, and at the sides of the unit in which the rollers are rotatably journaled. The structure is a simple, inexpensive and rugged one, and can be installed during the ordinary construction of the reel with speed and facility.

A further improvement relates to a specific mounting provision for the rollers of the eccentric assembly. They are individually journalled on annular bushings, which are in turn received on pivot pins extending through the side disks of that assembly. The bushing is of somewhat greater axial length than the roller, hence the bushings act as spacers rigidly clamped between the side disks and assisting in bracing the latter in properly spaced relation to one another, while affording a good anti-friction mount for the individual rollers.

The side disks of the eccentric unit are further held spaced by a pair of internal arcuate flanges arranged in concentric relation to one another about an axis which is the axis of the reel proper, and a tubular journal bushing or bearing for the reel shaft extends through the side disks of the eccentric assembly at this axis, being preferably welded to the disks and thus serving as a still further spacer therefor. The disks are each provided with a plurality of apertures correspondingly spaced arcuately between the internal flanges just referred to, enabling the eccentric unit to be adjustably clamped in fixed relation to an appropriate bracket support by means of bolts or studs extending through the latter and through the disk holes. This permits swinging of the eccentric bat control assembly as a whole about the reel shaft as an axis, followed by clamping of the eccentric roller unit to adjust the bat control arms in desired position relative to the arms of the reel proper.

The foregoing statements are indicative in a general way of the nature of the invention. Other and more specific objects will be apparent to those skilled in the art upon a full understanding of the construction and operation of the eccentric device.

A single embodiment of the invention is presented herein for purpose of illustration. It will be appreciated that the invention may be incorporated in other modified forms coming equally within the scope of the appended claims.

Fig. 1 is a fragmentary perspective view generally illustrating the installed, operative relationship of the improved eccentric device to a standard type of pick-up reel;

Fig. 2 is an enlarged face view of the eccentric device, per se, being broken away along several lines to better illustrate the composition thereof;

Fig. 3 is an enlarged view in cross section along broken line 3—3 of Fig. 2 further illustrating the nature and relationship of the parts; and Fig. 4 is an exploded view in perspective of the basic components of the improved eccentric device.

Referring first to Fig. 1, there is shown a conventional type of agricultural pick-up reel, characterized by a pair of rotatable end frames 10 having radiating wooden arms 11 rigidly coupled by chord-like steel straps 12. The inner ends of the arms 11 are appropriately secured to a main, longitudinally extending reel shaft 13, which is driven in a known fashion, and the outer ends of those arms serve as journals for the shafts of conventional longitudinally extending wooden bats 14. These are equipped with depending wire tines 15. The outwardly projecting end of each bat shaft has one end of a straight crank 16 rigidly mounted thereon to control the angular position of the bat, and the opposite end of each crank is pivotally connected to the extreme outer end of a radiating arm 17 of a bat control unit 18 of the reel. The outer ends of the arms 17 are braced in spaced relation by means of rigid chord-like metal straps 19.

Unit 18 consists of a plurality of these radiating arms each rigidly clamped at its inner end to a rotary eccentric control spider 20 of the present improved eccentric device, generally designated 21.

It is the purpose of the eccentric device 21, through a parallelogram linkage constituted by its spider 20, the respective radiating reel and control arms 11, 17 and cranks 16, to maintain bats 14 and tines 15 in proper vertical position at all times in the rotative movement of reel 10. To this end, spider 20 rotates, about an axis eccentric of reel shaft 13, on a coacting eccentric track roller assembly or unit, generally designated 22.

Unit 22 comprises a pair of circular side disks 23 which are fixedly held coaxially in parallel, laterally spaced relation, and between which a circularly arranged series of track follower rollers 24 are journalled. As shown in Figs. 2 and 4, rollers 24 project outwardly of the periphery of the disks 23, and they are relatively loosely received in annular bushings 25, which in turn fit loosely on pivots 26. These pivots may be in the form of simple bolts and nuts clamping disks 23 against the opposite ends of each bushing 25. Bushings 25 are of slightly greater axial length than the rollers 25 (Fig. 3) and therefore act as spacers for disks 23, the rollers rotating freely about their journals constituted by the bushings.

The main reel shaft 13 is received in a shaft bushing hub 27 extending through aligned eccentric apertures in side disks 23 and preferably welded to the respective disks to further space the same and rigidify assembly 22.

Disks 23 are still further spaced by a pair of interior, spaced arcuate flanges 28. These are disposed in concentric relation to shaft bushing 27 and are welded to one of the disks. The disks themselves are provided with transversely aligned series of arcuately spaced holes 29 adapted to receive a locking bolt or stud 30 (Fig. 1) extending through a bracket 31 on a mounting device 32 connected to a reaper or harvester with which reel 10 is associated. The outer ends of main reel shaft 13 are journalled in a suitable bearing 33 carried by this member. It is to be understood that the eccentric and eccentric mounting structure herein described is duplicated at both ends of the reel. Selective positioning of the lock bolt 30 in aligned holes 29 of the side disk 23 permits eccentric track roller unit 22 to be adjustably positioned angularly in relation to reel shaft 13 as desired, thus adjusting the eccentric device 21 and bat control unit 18 as a whole to regulate the angularity of bats 14.

The spider 20 of device 21 is provided with a circular track 34 within which run the rollers 24 of unit 22. This track is afforded by an axially extending flange or web welded on the inner surface of one of two like, centrally apertured side plates 35 which make up spider 20.

Side plates 35 are fabricated in a star shaped, spider-like outline, their points 36 being in lateral register and their laterally aligned central openings 37 being of slightly smaller diameter than that of eccentric roller unit disks 23. Track 34 is concentric on its inner annular surface with the circular pitch line of the axes of track rollers and travels frictionlessly thereon as spider 20 rotates. The inward radial overlapping of spider side plates 35 on disks 23 provides a side seal preventing lateral entry of dirt, dust, foreign matter, etc., to rollers 24; these are correspondingly shielded in the radial direction by the eccentric track 34, which is of sufficient width to substantially bridge the axial space between plates 35, as shown in Fig. 3. The points 36 of spider plates 35 are apertured at 36' to receive bolts 39 by which the inner ends of bat control arms 17 are clamped between the sides of spider 20.

In use as illustrated in Fig. 1, with position of eccentric roller unit 22 determined by angular rotation about reel shaft 13 as an axis, and with the same clamped by bolt 30 in the desired position, the track rollers 24 afford an eccentric journal for spider 20, whereby bat control unit 18 partakes of anti-friction travel in maintaining vertical position of the bats 14 and tines 15 at all times. The rollers are internally shielded in a novel manner, without possibility of "freezing," due to interference by another part or to jamming in the presence of foreign matter or by reason of deterioration from exposure. The structure is exceedingly simple and inexpensive, as well as rugged and fool proof.

I claim:

1. An eccentric device for a pick-up reel, comprising an eccentric track roller unit mounted in eccentric relation to a shaft for the reel, said unit having a pair of side disks in parallel spaced relation and a series of spaced track rollers journalled in an arcuate series between said disks, said rollers projecting beyond the perimeter of said disks, and a movable bat control unit rotatably guided by said eccentric unit, said control unit comprising a housing formed from a pair of centrally apertured side plates the inner peripheral portions of which overlap the outer peripheral portions of said side disks, one of said side plates carrying radially inwardly of its inner periphery and transversely directed toward the other of said side plates an annular track the interior surface of which engages and is rollingly supported by said rollers.

2. An eccentric device for a pick-up reel, comprising an eccentric track roller unit mounted in eccentric relation to a shaft for the reel, said unit having a pair of side disks in parallel spaced relation and a series of spaced track rollers journalled in an arcuate series between said disks, said rollers projecting beyond the perimeter of said disks, said disks being apertured eccentrically of said series to receive the reel shaft, and a movable bat control unit rotatably guided by said eccentric unit, said control unit comprising a housing formed from a pair of centrally apertured side plates the inner peripheral portions of which overlap the outer peripheral portions of said side disks, one of said side plates carrying radially inwardly of its inner periphery and transversely directed toward the other of said side plates an annular track in concentric relation to said roller series, the interior surface of which engages and is rollingly supported by said rollers.

3. A device in accordance with claim 1 in which said track rollers are journalled between the side disks of said eccentric unit in bushings which are rigidly clamped by and between said disks to fixedly space the same.

4. An eccentric device for a pick-up reel, comprising an eccentric track roller unit adapted to be mounted in eccentric relation to a shaft for the reel, said unit having a pair of circular side disks in parallel spaced, coaxial relation and a series of track rollers journalled between said disks in a circular series eccentric to said reel shaft, said rollers projecting in part outwardly beyond the perimeter of said disks but being otherwise laterally shielded thereby, a bearing for said reel shaft extending transversely through said disks in eccentric relation to said series of rollers, and a bat control unit rotatably guided by said eccentric unit, said control unit comprising a continuous circular track against the interior surface of which said rollers engage, and a pair of parallel external side plates coaxial with and radially inwardly overlapping the side disks of said eccentric unit to further shield the side of said track rollers, said track extending between said side plates in circumferential shielding relation to said rollers and being secured to one thereof.

References Cited in the file of this patent

UNITED STATES PATENTS

| | | |
|---|---|---|
| 1,389,789 | Stephens et al. | Sept. 6, 1921 |
| 2,497,729 | Heth et al. | Feb. 14, 1950 |
| 2,509,371 | Schroeppel | May 30, 1950 |